Sept. 12, 1967 J. R. KRUSE, JR 3,341,653

VIDEO TRACKER

Filed Dec. 5, 1963 6 Sheets-Sheet 1

INVENTOR.
JOHN R. KRUSE, Jr.
BY Joseph Levinson
ATTORNEY

INVENTOR.
JOHN R. KRUSE, Jr.
BY Joseph Levinson
ATTORNEY

INVENTOR.
JOHN R. KRUSE, Jr.
BY Joseph Levinson
ATTORNEY

INVENTOR.
JOHN R. KRUSE, Jr.
BY Joseph Levinson
ATTORNEY

Sept. 12, 1967 J. R. KRUSE, JR 3,341,653

VIDEO TRACKER

Filed Dec. 5, 1963 6 Sheets-Sheet 5

INVENTOR.
JOHN R. KRUSE, Jr.
BY Joseph Levinson
ATTORNEY

Sept. 12, 1967 J. R. KRUSE, JR 3,341,653

VIDEO TRACKER

Filed Dec. 5, 1963 6 Sheets-Sheet 6

INVENTOR.
JOHN R. KRUSE, Jr.
BY Joseph Levinson
ATTORNEY

United States Patent Office 3,341,653
Patented Sept. 12, 1967

3,341,653
VIDEO TRACKER
John R. Kruse, Jr., Weston, Conn., assignor to Barnes Engineering Company, Stamford, Conn., a corporation of Delaware
Filed Dec. 5, 1963, Ser. No. 328,276
4 Claims. (Cl. 178—6.8)

ABSTRACT OF THE DISCLOSURE

The field of view of a video camera has a portion of its field of view, including a target to be tracked, enclosed by an electronic window which is framed by signals derived from sync pulses from the camera. A reference pulse of short duration is generated corresponding in time to the center of the electronic window and the video signals are clamped to the reference level of the reference pulse. Error signals are generated when the target varies from the center of the window and the errors are used to move the window to keep the target centered therein.

Figure 1:
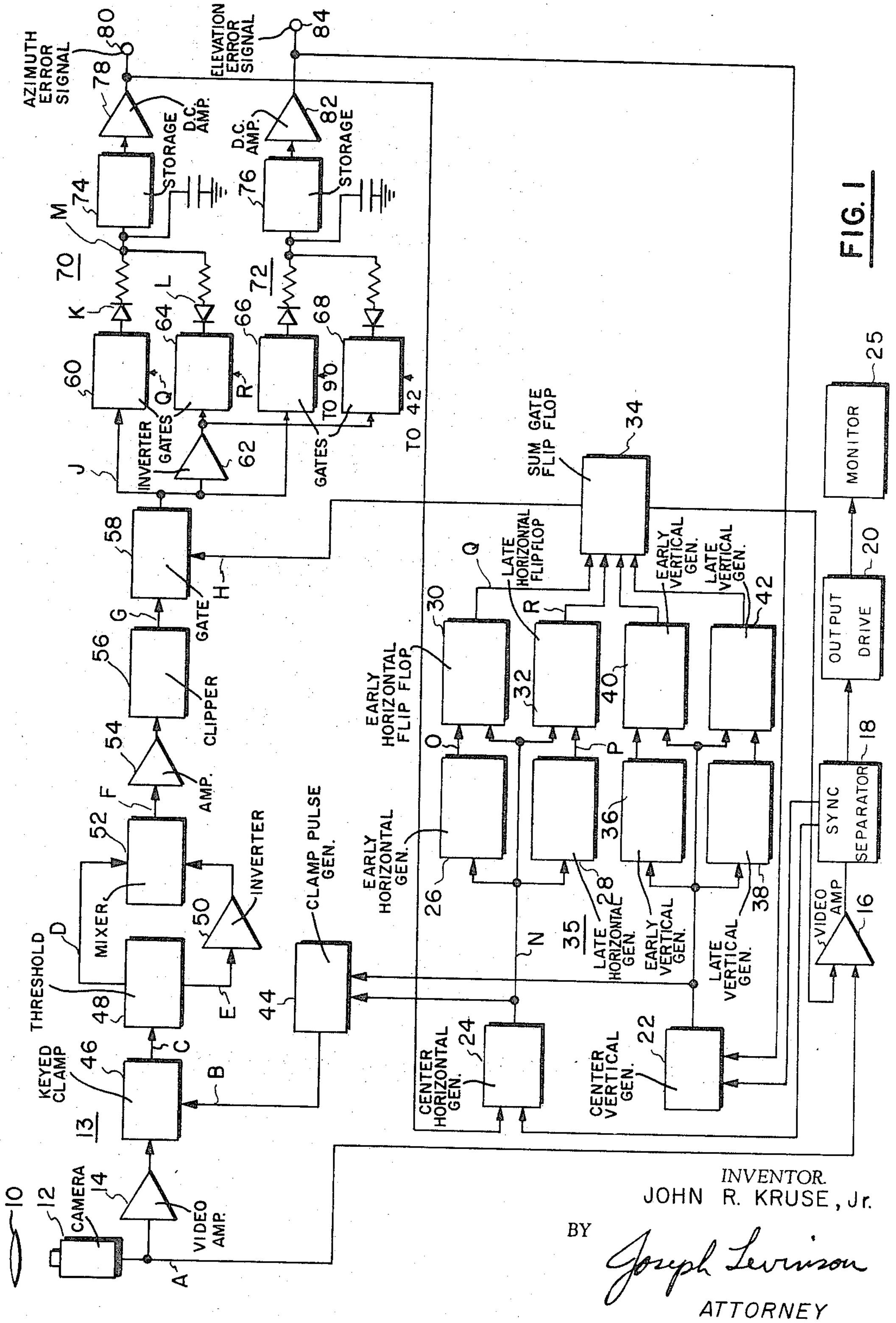

This invention relates to an improved video tracking system for tracking rapidly moving targets.

The operating capabilities of a video tracking system depend largely on its ability to discriminate between the desired target and the background or undesired target material appearing in the field of view of the video camera used in the system. One approach to the problem is to provide a tracking system in which the background level of the field of view is sensed automatically. In such a system, target information is then defined as any deviation from the sensed background level with a given area of the field of view of the tracker. The target information could then be either brighter or darker, or a combination of both, referenced to the background level which has been, and is continually being sensed by the tracker. A system embodying this type of approach performs well for small point-source targets, i.e., for those targets which occupy less than 10% of the total area of the field of view. However, the system does not function at all in a random background environment or for large, low-contrast targets.

It is an object of the present invention to provide an improved video tracking system wherein background variations in the field of view do not affect the ability of the tracking system to discriminate a target.

A further object of this invention is to provide an improved video tracking system that can be used with random picture information.

Another object of this invention is to provide a video tracking system which is capable of following large, low-contrast targets.

Still another object of this invention is to provide an improved video tracking system which is capable of following slow changes in target brightness while maintaining an accurate track of the target as long as there is contrast between the target and its environment.

In carrying out this invention in one illustrative embodiment thereof, a video tracking system is provided in which a portion of the field of view, which includes the target to be tracked, is isolated by what is referred to as an "electronic window," which is framed by signals derived from the horizontal and vertical synchronizing (snyc) pulses produced by the camera of the system. A reference pulse of short duration is generated corresponding in time to the center of the electronic window, and the video signals produced by the camera are clamped to the reference level in accordance with the reference pulse, thereby providing a target reference system, as distinguished from a background reference system. The video waveform so clamped is further processed to produce error signals in the horizontal and vertical directions when the target position deviates from the center of the electronic window. The error signals, in turn, are fed back to the circuitry which establishes the electronic window for moving the window to maintain the target at its center. The generating circuitry for providing the electronic window is capable of producing an electronic window of various sizes without changing the position of its center.

Figure 2:
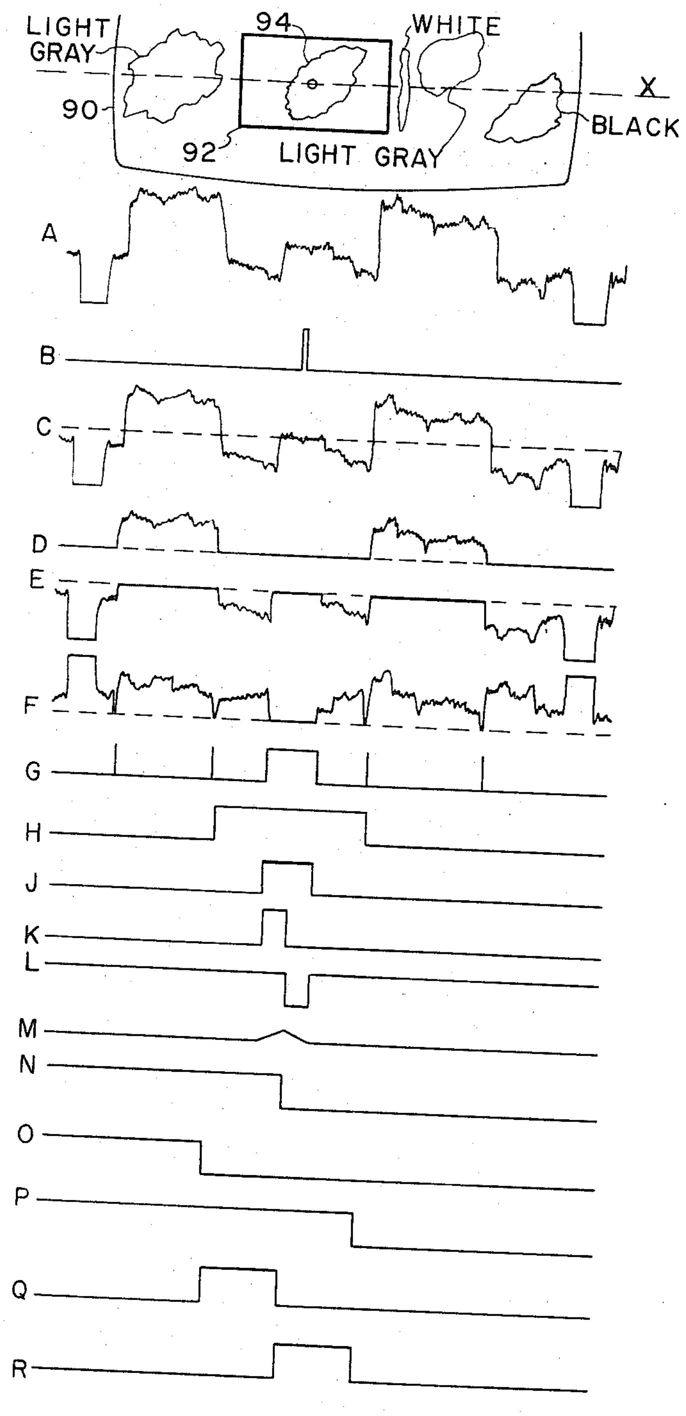
Figure 3:
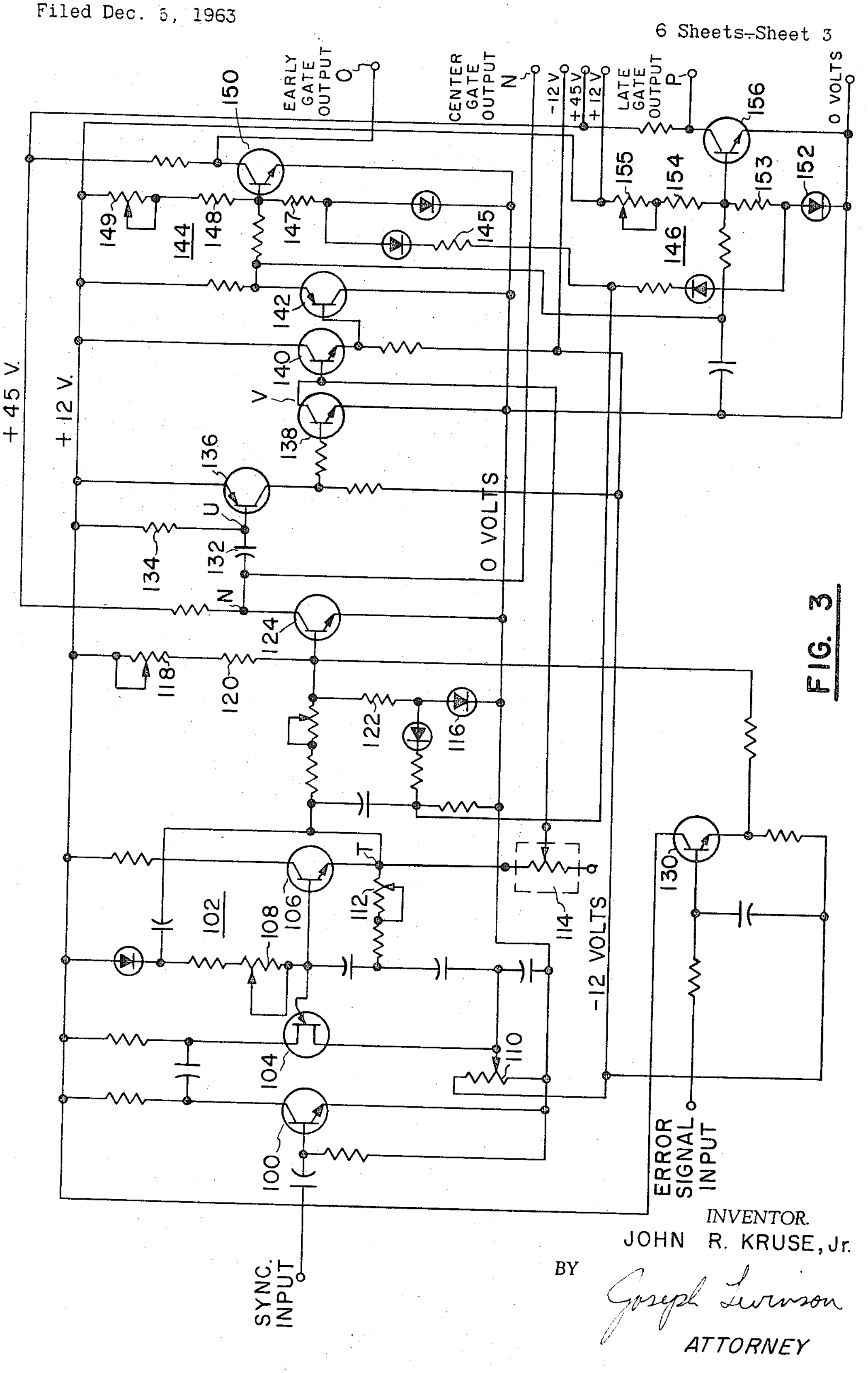
Figure 4:
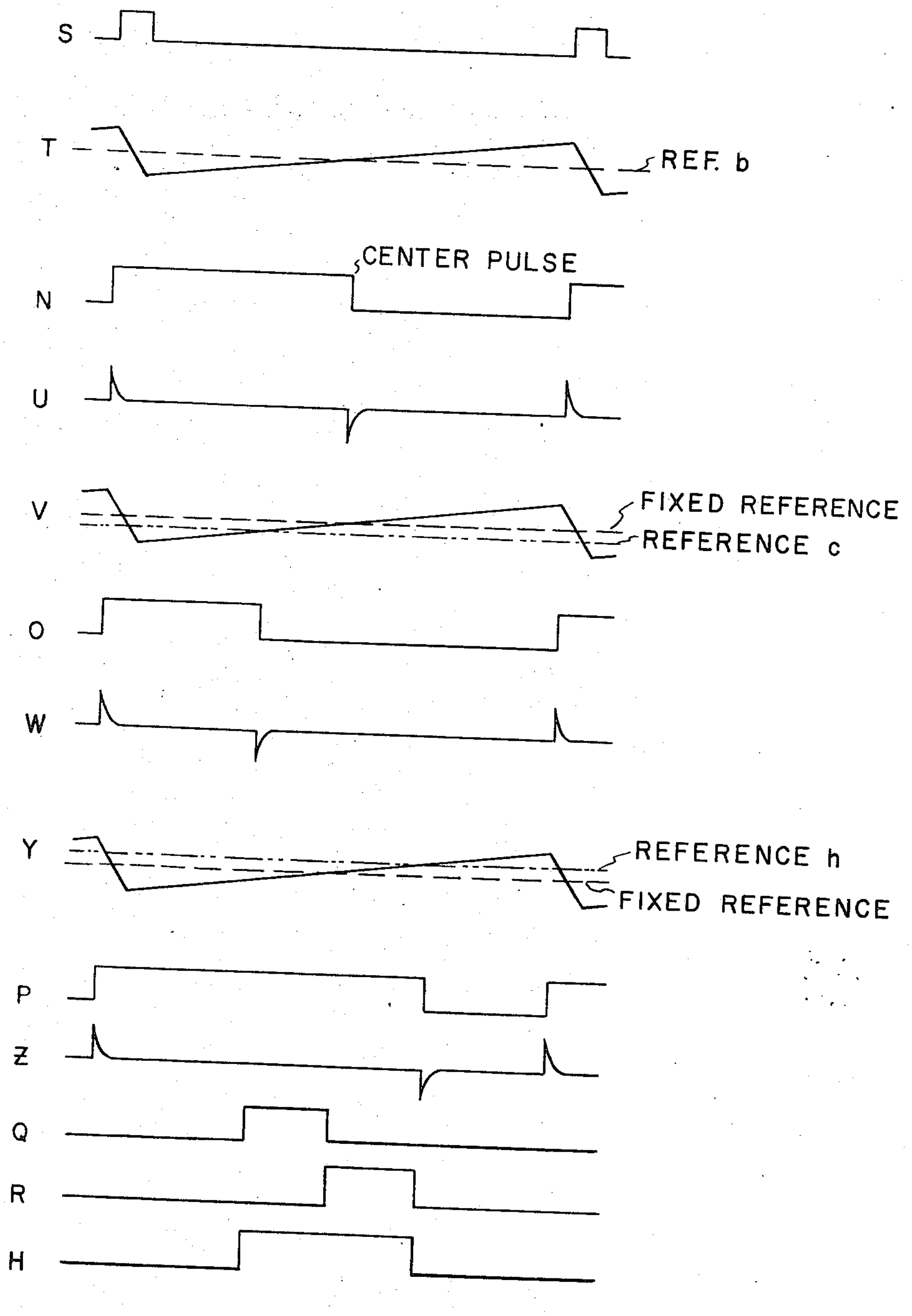
Figure 5:
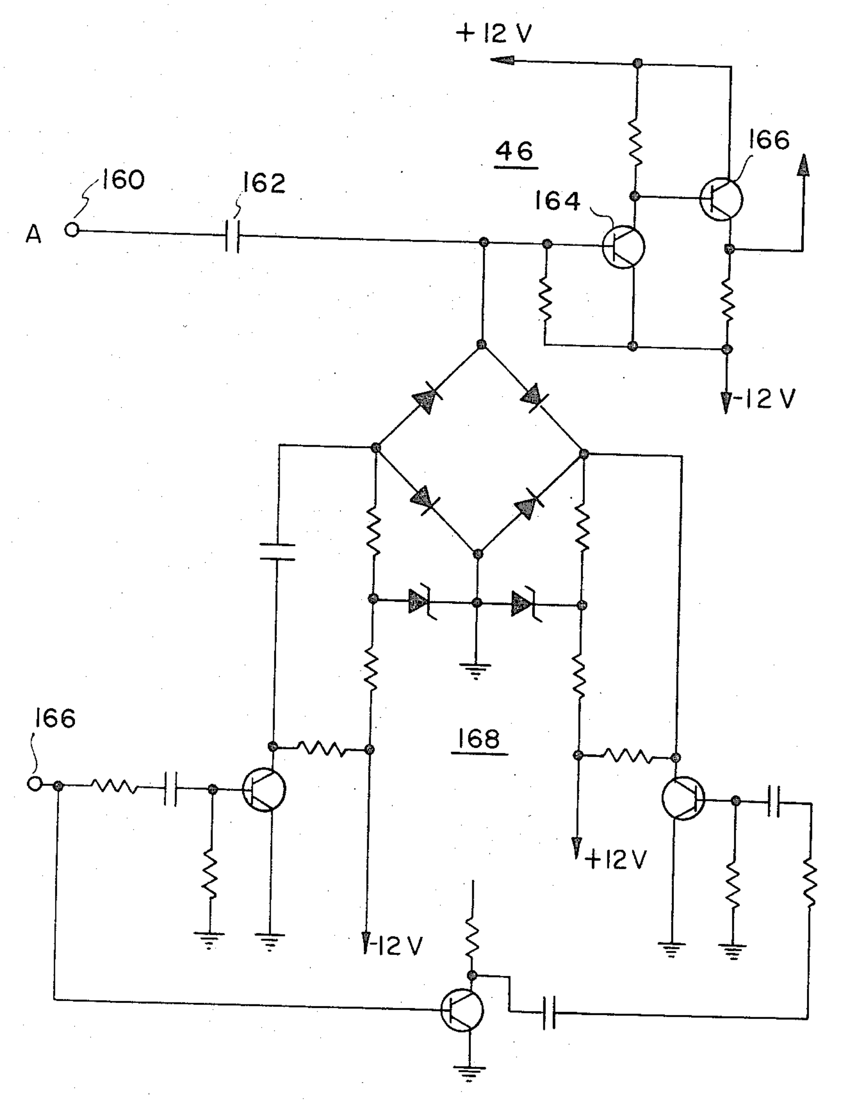
Figure 6:
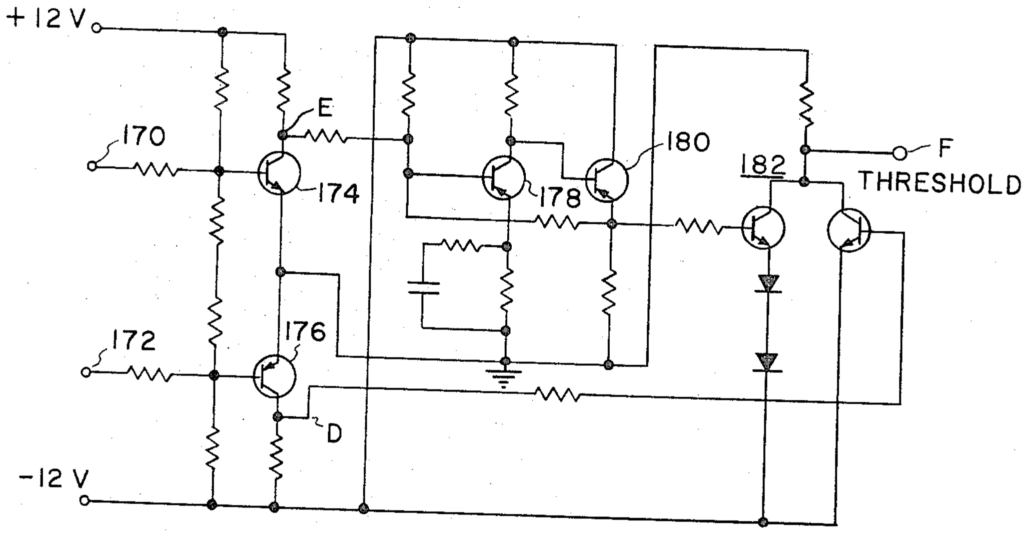

The invention, both as to its organization and method of operation, together with further objects and advantages thereof, may best be understood from the following description taken in connection with the accompanying drawings, in which:

FIG. 1 shows a block diagram of the improved video tracker embodied in this invention, FIG. 2 shows a monitor raster presentation of the field of view of the system of FIG. 1, together with a plurality of waveforms appearing at various points in the block diagram of FIG. 1, FIG. 3 is a schematic diagram of horizontal gate pulse generator suitable for use in the system of FIG. 1, FIG. 4 shows a series of waveforms appearing at various points in the circuit of FIG. 3, FIG. 5 is a schematic diagram of a keyed clamp circuit suitable for use in the system of FIG. 1, and FIG. 6 is a schematic diagram of a threshold and mixer circuit suitable for use in the system of FIG. 1.

The target reference video tracker will be explained by the use of the block diagram of FIG. 1, together with the waveforms of FIG. 2. Then specific circuitry for carrying out the various functions will be described.

Referring now to FIG. 1, if needed, an optical means such as an objective 10 may be utilized to focus a field of view on a conventional television camera 12. The video signal output from the camera 12 is applied to a video information processing channel 13 via a video amplifier 14. The video signals are also applied through a video amplifier 16 and a sync separator 18 to an output drive circuit 20 which drives a monitor receiver 25. The monitor raste presentation is shown on FIG. 2, and includes a field of view 90, an electronic window 92, and a target 94, together with other random video information arising from a varied target background. To illustrate what a single line through the field of view looks like, a horizontal line *x* is chosen and the video waveform of line *x* is represented by waveform A in FIG. 2. Waveform A includes a pair of horizontal synchronizing pulses which appear at the beginning and the end of line *x* and for every other line scanned by the TV camera.

The electronic window 92 is generated electronically by an electronic window generating circuit 35 which is derived from the horizontal and vertical sync pulses from the TV camera 12 and controlled by horizontal and vertical error signals which will be explained hereinafter. The purpose of the electronic window 92 is to frame the target within the field of view 90, and thus electronically eliminate all other signals from other portions of the field of view of the video camera 12. The size of the electronic window depends on the size of the target to be tracked, but under any circumstance, to work properly, the target 94 must be totally enclosed by the electronic window 92.

The electronic window generating means 35 includes a center horizontal pulse generator 24, which has horizontal synchronizing pulses from the video waveform appearing at the sync separator 18 applied therein to generate at its output a waveform N. The waveform N from the center horizontal pulse generator 24 is applied to an early horizontal pulse generator 26 and a late horizontal pulse generator 28, and also to an early horizontal gate flipflop 30 and a late horizontal gate flipflop 32. The early horizontal pulse generator 26 and the late horizontal pulse generator 28 produce waveforms O and P respectively, which are applied to the early horizontal gate flipflop 30 and the late horizontal gate flipflop 32, respectively. The early horizontal gate flipflop 30 produces a waveform Q and the late horizontal gate flipflop 32 produces a waveform R, which waveforms are applied to a sum gate flipflop 34. As will be noted, the waveforms O, P, Q and R are spaced in time sequence from the center horizontal pulse, waveform N. Similar vertical waveforms are generated by vertical circuitry at the lower vertical sync pulse rate, and applied to the sum gate 34. Vertical pulses from the sync separator 18 are applied to a vertical pulse generator 22, whose output is applied to an early vertical pulse generator 36 and a late vertical pulse generator 38, as well as to an early vertical gate flip-flop 40 and a late vertical gate flipflop 42. The outputs from the early vertical pulse generator 36 and the late vertical pulse generator 38 are respectively applied to the early vertical gate flipflop 40 and the late vertical gate flipflop 42. The sum gate 34 combines all the signals from the horizontal and vertical circuitry to produce a waveform H. A clamp pulse, which furnishes the target reference for the video tracker embodied in this invention, depends on the position of the target within the electronic window 92 and is accordingly derived from a clamp pulse generator 44 which is connected to the outputs of the center horizontal pulse generator 24 and the center vertical pulse generator 22. The clamp pulse generator 44 produces at its output a clamp pulse, as is shown in waveform B of FIG. 2.

Referring now to the video signal processing channel 13, the output of the video amplifier 14 is applied to a keyed clamp 46. The function of the keyed clamp 46 is to establish a reference level for the video signal of waveform A. This may be accomplished by tying the video signal to ground during the presence of the clamp pulse of waveform B which is generated by the clamp pulse generator 44. Since the clamp pulse occurs at the center of the electronic window 92, that video information which represents the target in waveform A is established at a predetermined reference level, such as ground. Waveform C in FIG. 2 shows the output of the keyed clamp, and from waveform C it is quite apparent that only the video information representing the target is at the reference level. The waveform C is applied to a threshold circuit 48 which produces at one output waveform D, depicting information which is whiter than the reference level, and waveform E from another output thereof which depicts information which is blacker than the reference level. Waveform E is applied to an inverter 50, and therefrom to a mixer 52 along with the waveform D to produce an output in the form of waveform F. The mixer 52 is connected to an amplifier 54 which in turn is connected to a clipper circuit 56 producing an output therefrom in the form of waveform G. Waveform G is applied to a gate 58. Since gate 58 also has the waveform H applied thereto from the sum gate 34, the only video information which passes the gate 58 is that which falls within the sum gate signal in accordance with waveform H. Therefore, the waveform J, which is the output from the gate 58, contains video information derived only from the target 94.

Error signals for the system are generated by applying the video pulse, waveform J, to gates 60 and 66, and after inversion by inverter 62 to gates 64 and 68. The gates 60 and 64 have waveforms Q and R, respectively, applied thereto from the early horizontal gate 30 and the late horizontal gate 32, respectively. Waveform K shows that portion of the video pulse that occurs during the early horizontal gate and waveform L shows that portion of the inverted video pulse that occurs during the late horizontal gate. By feeding these two signals into a common integrator 70, the voltage that appears across the integrator capacitor would appear as shown in waveform M. If the waveforms K and L are of equal width, the voltage appearing across the integrator capacitor is zero. If, however, the width of the waveform K is large compared to the width of waveform L, a positive voltage appears across the integrator network 70. Conversely, if the width of waveform L is greater than the width of the waveform K, a negative voltage appears across the capacitor of the integrator network 70. The DC voltage of waveform M, if any appears, is stored by a storage circuit 74 for the duration of one frame and applied to a DC amplifier 78, which produces an output horizontal or azimuth error signal at output terminal 80. The azimuth error signal is applied to the center horizontal pulse generator 24 in such polarity to drive the electronic window circuit 35 to the center of the target 94 being tracked. The azimuth error signal appearing at output terminal 80 can also be used to control the azimuth channel of a servo-driven camera pedestal (not shown). A similar process takes place in the vertical direction to produce an elevation error signal. The output of early vertical gate 40 is applied to the gate 66, and the output of late vertical gate 42 is applied to gate 68, and signals passed by these gates are applied to an integrator circuit 72, stored in a storage circuit 76, and applied to a DC amplifier 82 at the duration of one frame, to produce elevational error signals at output terminal 84. The elevational error signal is also coupled to the center vertical pulse generator 22, and controls it in the same manner as the azimuth error signal which is fed to the center horizontal pulse generator 24.

In order to be able to track a target in accordance with the target reference system, the target must be isolated from its background by the electronic window generating means 35, with the video information being clamped to a target reference level taken at a point which represents the center of the electronic window. The center point must be capable of being moved or controlled in accordance with error signals generated by the system as the target moves within the field of view of the camera. Furthermore, the size of the electronic window should be capable of being varied in both the horizontal and vertical directions without changing the crossover point or center of the window in order that targets of varying size may be tracked. In other words, the gating pulses produced by the horizontal gates 30 and 32, and the vertical gates 40 and 42 must be capable of being shifted in time and varied in gate width without changing the center point of the electronic window 92. A novel circuit for accomplishing these results is shown partially in FIG. 3, which shows the manner in which the center horizontal pulse generator 24, the early horizontal pulse generator 26, and the late horizontal pulse generator 28 produce the desired result. The circuitry for generating the vertical pulses is not shown, but will be the same as that shown in FIG. 3 for horizontal pulses, with the exception of the fact that the vertical pulse circuitry will operate at the lower vertical pulse rate. The waveforms as shown in FIG. 4 will be utilized to explain the operation of the circuit of FIG. 3, and those waveforms which are similar to those shown in FIG. 2 are designated with the same reference letters.

Referring now to FIGS. 3 and 4, positive-going horizontal sync pulses (waveform S) are applied and amplified by a transistor amplifier 100. The amplified sync pulses are coupled to a conventional transistor sawtooth oscillator circuit 102, including a unijunction transistor 104 and an emitter follower transistor 106. The oscillator 102 is provided with a frequency control 108, a DC centering control 110, and a linearity control 112. An extremely linear sawtooth waveform T appears at the emitter electrode of the transistor 106 across the variable emitter load 114. The sawtooth output of the oscillator 102 is applied to a tunnel diode switching circuit which includes a tunnel diode 116, which conducts at a reference level set by resistors 118, 120, and 122. This reference level is shown as reference level *b* on waveform T. The junction of resistors 120 and 122 is connected to a base electrode of a transistor 124, so that when the sawtooth waveform is applied to the tunnel diode 116 and the transistor 124, a negative-going step function in the form of waveform N appears at the collector electrode of the transistor 124. Waveform N corresponds to the center pulse provided by the center horizontal pulse generator 24.

Since the center pulse is produced by a negative-going step function produced by time coincidence between the sawtooth waveform T and the reference level *b*, the generation of the center pulse may be varied by changing the DC reference level *b*. This may be accomplished in the present system by feeding an azimuth DC error signal from the azimuth error output terminal 80 to a transistor amplifier 130 connected as an emitter follower to provide a DC output at the junction of resistors 120 and 122, which, in effect, will vary the reference level *b* providing an effective method of changing the position of the negative-going step function at the output of transistor 124 and, accordingly, changing the position of the center pulse.

The waveform N generated by the center horizontal pulse generator 24 is then used to derive waveforms O and P from the early horizontal pulse generator 26 and the late horizontal pulse generator 28, respectively. The waveform N is differentiated (waveform V) through a capacitor 132 and a resistor 134, and amplified by a transistor 136 to form a clamp pulse to operate a keyed clamp transistor 138. The transistor 138 provides a fixed reference level for the sawtooth waveform T taken from resistor 114 and applied to the collector electrode of the transistor 138, producing waveform V at the collector electrode output thereof. Waveform V is identical to waveform T except that waveform V is capacitively coupled to the transistor 138 which references waveform V to a given fixed DC reference level coinciding in time with the negative spike of waveform U. If the negative spike of waveform U occurred earlier in the sawtooth period, the entire waveform V would be displaced upwards from its indicated position. The newly referenced waveform V is impedance-transformed through a Darlington circuit comprised of transistors 140 and 142, and then fed to two parallel coincidence circuits 144 and 146 with differing reference voltages to produce the early and late horizontal gate outputs. The coincidence circuit 144 includes a tunnel diode 145 having resistors 147, 148 and 149, which set the reference level *c* as shown on waveform V which determines the switching point for a transistor 150. Accordingly, when the clamped sawtooth waveform V and the reference voltage level *c* coincide, waveform O is generated at the output of transistor 150. The reference voltage level *c* is related to, but differs from, the reference level *b* by a predetermined fixed amount. Similarly, the coincidence circuit 146 includes a tunnel diode 152 having resistors 153, 154, and 155 which provide a reference level *h* in accordance with waveform Y, which reference level is higher than the reference level *c*, and the coincidence between sawtooth waveform V and reference level *h* being displaced in time to cause a transistor 156 to produce waveform P which is the late gate output. Although the circuitry is not shown, the waveform O may be integrated to produce waveform W, which, in turn, may be utilized to operate a flipflop circuit for generating waveform Q. Likewise, waveform P may be differentiated to produce waveform Z which, in turn, may be utilized to generate waveform R. Waveforms Q and R are then combined in the sum gate 34 to produce the sum gate waveform H. Similar vertical circuitry is utilized to control waveform H in the vertical direction.

The positioning of the waveforms Q, R and H may be controlled with respect to the sync pulses (waveform A) by varying the DC voltage reference *b* by applying a DC error signal to the transistor 130 as previously explained. If the reference voltage *b* goes negative, waveforms Q, R and H move to the left while maintaining their relative positions and their separate, distinct widths. Similarly, if the reference voltage *b* goes more positive, the waveforms Q, R and H move to the right with respect to waveform A.

The pulse width of the waveforms Q, R, and H may be controlled by controlling the amplitude of waveforms V and Y simultaneously, since they are derived from waveform T at a common point, namely, resistor 114. If the sawtooth waveforms V and Y are reduced in amplitude, the coincidence point in time with reference voltages *c* and *h* moves the position of the negative clamp pulse in waveform U. As the sawtooth waveforms increase in amplitude, the coincidence points move away from the clamp pulse of waveform U. This results in the leading edge of waveform Q and the trailing edge of the pulse of waveform R moving in and out, respectively, while leaving the trailing and leading edges of the pulses of waveforms Q and R, respectively, unchanged. Accordingly, the width of the sum gate pulse shown in waveform H may be varied without varying its center point. What then is provided is a system for generating a pair of gate pulses which can be shifted in time as a pair of pulses, and can be varied in individual gate width without changing the crossover point between the two gate pulses. The same thing is done in a vertical direction, and when the horizontal gate and the vertical gate pulses are summed, a versatile electronic window generating means 35 is thus provided.

The clamp pulse generator 44 of FIG. 1 must provide a clamp pulse as shown in waveform B at the precise coincidence of the center horizontal pulse and the center vertical pulse generated by the center horizontal pulse generator 24 and the center vertical pulse generator 22. This may be accomplished, for example, by a diode logic circuit which produces an output at the coincidence of these two points. The clamp pulse of waveform B is applied to a keyed clamp 46. One form of keyed clamp circuit 46 is shown in FIG. 5, in which the video waveform A is applied to an input terminal 160 of the keyed clamp circuit 46, and is capacitively coupled to a transistor 164. The clamp pulse B is fed to the input terminal 166 of a bridge circuit 168, which pulse unbalances the bridge, and ties the base of transistor 164 to a ground reference level during the occurrence of the clamp pulse. Impedance transformation is accomplished by a transistor 166 connected as an emitter follower allowing the transistor 164 to provide sufficient impedance which will hold capacitor 162 at the pulse reference level until the next pulse occurs. Waveform C appears at the output of transistor 166.

Referring now to FIG. 6, the clamped video waveform C is then applied to a pair of input terminals 170 and 172 of a threshold circuit including transistors 174 and 176. Transistor 176 is biased to conduct and pass signals whiter than the reference level set by the clamp pulse B, which produces waveform D at its output, while transistor 174 is biased to conduct all signals lower than the reference level, or blacker than the reference level, producing waveform E at its output. Waveform E is inverted by transistor 178 and applied via transistor 180 connected as an emitter follower to a mixer 182, while waveform D is applied from the emitter follower 176 to the mixer 182, producing at its output thereof waveform F.

The circuits shown in FIGS. 5 and 6 are merely illustrative of the type of circuits which can be utilized to perform the stated functions. Circuit voltages are shown on FIGS. 3, 5 and 6, which merely illustrate values which might be utilized. The invention, however, is not considered limited to the particular circuits shown nor their parameters. The remaining circuits which have not been specifically shown and described are believed to be conventional, and will not be described in detail. The storage circuits 74 and 76 may be in the form of a switching circuit which moves the charge from the integrator networks 70 and 72 and applies that charge to the DC amplifiers 78 and 82 in response to vertical synchronizing pulses. The error signal is thus stored for a whole frame before it is read out. This prevents geometric distortion in the electronic window.

The video tracker system described provides a method of tracking which is not affected by background variations. Therefore, this system may be used with random picture information. The system will follow slow changes in target brightness, and maintain an accurate track as long as there is contrast between the target and its environment. However, the system is not designed for, nor does it function properly for a point source, since by definition acquisition of the target with the present target reference video tracking system involves superimposing the clamp pulse on the top of the target. Accordingly, if the target size becomes smaller than the width of the clamp pulse, a great deal of difficulty would be encountered in attempting to maintain an accurate track using the target reference system. As previously pointed out, the target reference system works nicely with finite targets even in a random background environment.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A video tracker using a target reference system so that background variation surrounding the target of interest does not affect the ability of the tracker to discriminate the target, comprising, in combination, (a) a video camera for generating video signals, including horizontal and vertical sync pulses in accordance with a field of view which may include a target which is desired to be tracked, (b) sync separator means for separating said horizontal and vertical sync pulses from said video signals, (c) voltage controlled horizontal pulse generator means coupled to said horizontal sync pulses, (d) voltage controlled vertical pulse generator means coupled to said vertical sync pulses, (e) means for combining the output of said horizontal and vertical pulse generator means to produce an electronic window which covers a portion of the field of view containing the target to be tracked, (f) clamp pulse means coupled to said voltage controlled horizontal and vertical pulse generator means for generating a reference pulse of short duration corresponding in time to the center of said electronic window, (g) means for clamping said video waveforms to a reference level set by said reference pulse whereby the target being tracked is at the reference level, (h) means for generating error signals in both the horizontal and vertical directions of said electronic window, and (i) means for applying said error signals to said voltage controlled horizontal and vertical pulse generator means for keeping the target centered in said electronic window such that the video tracker automatically follows the target.

2. A video tracker as set forth in claim 1 including means for varying the size of the electronic window while maintaining its center point.

3. A video tracker as set forth in claim 1 wherein said electronic window generating means includes oscillator means operating in synchronism with synchronizing pulses from said video waveform to produce linear sawtooth outputs, means for deriving early, center and late output pulses from said waveform, said clamp pulse means being controlled by said center output pulses, means for changing the position of said center output pulses which are controlled by said error signals, and means for controlling the amplitude of said sawtooth waveforms which varies the pulse width of said early and late output pulses.

4. The structure set forth in claim 1 wherein said electronic window generating means includes a linear sawtooth oscillator for providing linear sawtooth outputs in synchronism with horizontal and vertical synchronizing pulses from said video waveforms, means for deriving early, center and late output pulses in both the horizontal and vertical directions, said clamp pulse means being controlled by said center output pulses means for varying the center pulse output of the vertical and horizontal pulses controlled by said error signals, means for controlling the early and late pulse outputs by varying the amplitude of said sawtooth waves while maintaining the center output pulse in the same position, and means for combining the early and late output pulses in both the horizontal and vertical directions.

References Cited

UNITED STATES PATENTS

| | | | |
|---|---|---|---|
| 2,774,964 | 12/1956 | Baker et al. | 178—6.8 X |
| 2,970,187 | 1/1961 | Hinton | 178—6.8 |
| 3,043,907 | 7/1962 | Martin | 178—6.8 |
| 3,257,505 | 6/1966 | Wechel | 178—6.8 |

JOHN W. CALDWELL, *Acting Primary Examiner.*

DAVID G. REDINBAUGH, *Examiner.*

R. L. RICHARDSON, *Assistant Examiner.*